United States Patent [19]

Seo

[11] Patent Number: 4,953,030
[45] Date of Patent: Aug. 28, 1990

[54] DEVICE FOR REMOVABLE ATTACHMENT OF AUDIO ADAPTER

[75] Inventor: Shuzo Seo, Tokyo, Japan

[73] Assignee: Asahi Kogaku Kogyo Kabushiki Kaisha, Tokyo, Japan

[21] Appl. No.: 407,075

[22] Filed: Sep. 14, 1989

[30] Foreign Application Priority Data

Sep. 30, 1988 [JP] Japan .......................... 63-127254[U]

[51] Int. Cl.$^5$ .............................................. H04N 5/30
[52] U.S. Cl. ................... 358/229; 174/138 G; 248/221.4
[58] Field of Search ............... 358/209, 906, 909, 229, 358/335; 360/33.1, 35.1; 174/138 G; 248/316.1, 500, 221.4, 221.3; 350/334; 361/403

[56] References Cited

U.S. PATENT DOCUMENTS

| 3,996,500 | 12/1976 | Coules | 248/316.1 |
| 4,537,821 | 8/1985 | Fast | 248/221.4 |
| 4,728,753 | 3/1988 | Nakano | 174/138 G |
| 4,796,977 | 1/1989 | Drake | 350/334 |
| 4,813,642 | 3/1989 | Matsui | 248/221.4 |

Primary Examiner—James J. Groody
Assistant Examiner—Safet Metjahic
Attorney, Agent, or Firm—Sughrue, Mion, Zinn, Macpeak & Seas

[57] ABSTRACT

A one-touch device for removably attaching an audio adapter to optical equipment. A receptive mechanism is provided on one of the audio adapter or the optical equipment, and an insertion mechanism is provided on the other. A lock release mechanism and a movable plate associated with the insertion mechanism may be controlled by a common spring, thus reducing the number of necessary parts. Only a single touch is necessary to disengage the mechanisms from each other.

5 Claims, 4 Drawing Sheets

DEVICE FOR REMOVABLE ATTACHMENT OF AUDIO ADAPTER

BACKGROUND OF THE INVENTION

This invention relates to a device for removably attaching an audio adapter to optical equipment such as an electronic still camera and a video camera.

Some electronic still cameras are provided with an image recording mechanism for storing a signal, representative of the image of a subject, in a magnetic disk, and an audio recording mechanism for magnetically recording voice signals.

An electronic still camera has been developed in which an adapter having an audio processing function can be removably attached to the camera as needed in order to make the electronic still camera more compact.

FIG. 5 is a cross-sectional view of a portion of a conventional device for removably attaching an audio adapter. This removable attachment device 30 comprises a receptive mechanism provided on a side wall 31a of a casing of the electronic still camera 31, and an insertion mechanism provided on a side wall 32a of a casing of the audio adapter 32. The audio adapter 32 is attached to the still camera 31 in contiguous relation thereto.

More specifically, a base plate 33 is mounted within the casing of the electronic still camera 31, and the base plate 33 has at its center an internally threaded portion 33a for receiving a lock screw 34, the base plate 33 having a female connector member 35b mounted on a lower portion thereof. Receiving holes are formed through the casing side wall 31a and are disposed in registry with the threaded portion 33a and the female connector member 35b, respectively. A hole 31a1 is formed through the upper portion of the casing side wall 31a for positioning or registration purposes.

The audio adapter 32 has the lock screw 34 extending through the other casing side wall 32b and the casing side wall 32a, a male connector portion 35a extending outwardly from the casing side wall 32a, and a positioning projection 32a1 formed on the upper portion of the side wall 32a.

With this construction of the removable attachment device 30, the positioning projection 32a1 and male connector portion 35a of the audio adapter 32 first are inserted respectively into the positioning hole 31a1 and female connector member 35b of the electronic still camera 31. Then, the lock screw 34 is threaded into the internally threaded portion 33a of the electronic still camera 31 to tie the audio adapter and the electronic still camera together.

For removing the audio adapter 32 from the electronic still camera 31, the lock screw 34 is loosened, and then the audio adapter 32 is pulled away from the electronic still camera 31. The audio adapter 32 provided with the removable attachment device 30 converts an electric voice signal, produced by a microphone or the like, into a digital signal, which then is fed to the female connector member 35b of the electronic still camera 31 via the male connector portion 35a.

The electronic still camera 31 electrically converts an image, picked up by its optical system, into a digital image signal, and stores this signal in a magnetic disk together with the above audio digital signal.

The information thus stored in the magnetic disk is used in various ways, such as display and printing, by a reproducing device.

In the above conventional device 30 for the removable attachment of an audio adapter, the adapter is attached to the electronic still camera by the lock screw 34. Therefore, considerable time is required for the attachment and detachment of the audio adapter 32, making the attachment and detachment operations rather cumbersome.

Further, since the lock screw 34 extends through the interior of the audio adapter 32 between the opposed side walls of the casing, there is a problem in that the lock screw 34 limits the arrangement of the component parts within the casing of the audio adapter.

SUMMARY OF THE INVENTION

Therefore, it is an object of this invention to provide a removable attachment device which enables one-touch attachment and detachment an audio adapter with respect to optical equipment, and which is compact in size to save space.

According to a first aspect of the invention, there is provided a device for removably attaching an audio adapter to optical equipment, wherein a receptive mechanism is provided on one of the optical equipment and the audio adapter while an insertion mechanism is provided on the other. The receptive mechanism includes a receiving hole and a lock tongue; and the insertion mechanism includes a movable plate which is movable between a first position and a second position and is normally subjected to an urging force so as to be urged toward the first position, a pawl which projects from the movable plate into a position corresponding to the receiving hole and has a lock hole engaged with the lock tongue as well as an inclined surface at its distal end, and a lock release mechanism for moving the movable plate to the second position against said urging force.

According to a second aspect of the invention, there is provided a device for removably attaching an audio adapter according to the first invention, in which the receptive mechanism is provided on the optical equipment such as an electronic still camera, the insertion mechanism being provided on the audio adapter.

According to a third aspect of the invention, there is provided a device for removably attaching an audio adapter according to the first invention, in which a common spring acts both as a resilient member for urging the movable plate toward the first position, and as a resilient member for returning the lock release mechanism to an inoperative position.

The optical equipment and the audio adapter are disposed in opposed relation to each other, and the pawl and connector of the insertion mechanism are gradually inserted into the receiving hole and connector-receiving hole of the receptive mechanism, respectively.

At this time, since the inclined surface at the distal end of the pawl of the insertion mechanism is held in sliding contact with the lock tongue in the receiving hole, the movable plate is subjected to a force resisting the urging force tending to move the movable plate toward the first position, so that the movable plate is moved from the first position toward the second position.

Subsequently, when the lock hole of the pawl is brought into registry with the lock tongue in the receiving hole, the movable plate is returned to the first position by the urging force, so that the lock hole of the pawl and the lock tongue in the receiving hole are engaged with each other, thus achieving attachment of the audio adapter.

When the lock release mechanism is manipulated to move the movable plate toward the second position against the urging force, the engagement between the lock hole of the pawl and the lock tongue in receiving hole is released, so that the audio adapter can be removed.

The distal end of the pawl is not necessarily provided with the inclined surface, in which case insertion is effected while moving the movable plate toward the second position by the lock release mechanism.

DETAILED DESCRIPTION OF A PREFERRED EMBODIMENT

A device for removably attaching an audio adapter to an electronic still camera will now be described with reference to the drawings by way of a preferred embodiment.

Figure 1:
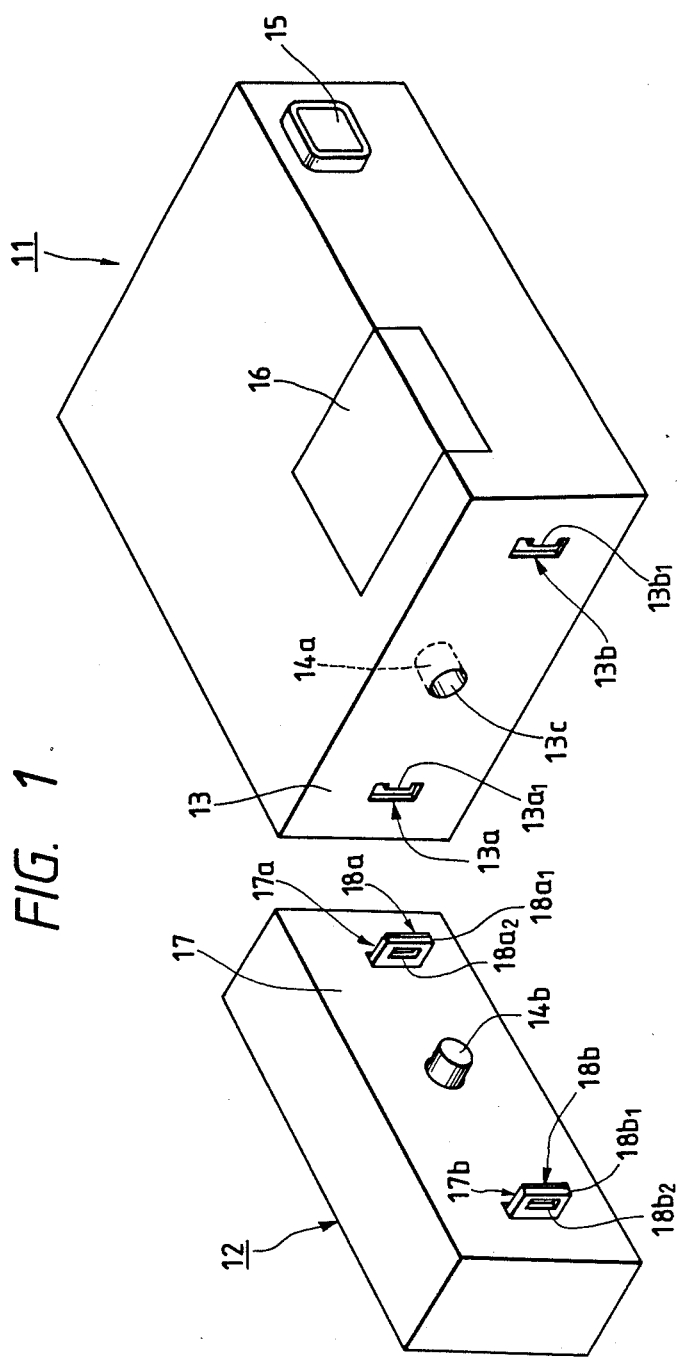
FIG. 1 is a perspective view, showing an electronic still camera and an audio adapter which are provided with a removable attachment-performing device.

FIG. 1 is a perspective view showing the electronic still camera and the audio adapter which are provided with the removable attachment device. The removable attachment-performing device includes a receptive mechanism provided on the electronic still camera 11, and an insertion mechanism provided on the audio adapter 12. Left and right receiving holes 13a and 13b are formed through a side wall 13 of a casing of the electronic still camera 11, and are spaced apart from each other by a predetermined distance. A connector hole 13c is formed through the casing side wall 13, and is disposed substantially midway between the receiving holes 13a and 13b.

Each of the receiving holes 13a and 13b is slightly elongated in the vertical direction. Lock tongues 13a1 and 13b1 project into these receiving holes, respectively, as shown in the drawings. A female connector portion 14a is mounted in the connector hole 13c.

The electronic still camera 11 further includes a finder ocular portion 15 and a magnetic disk container portion 16.

The insertion mechanism, constructed as follows, is partially exposed to a side wall 17 of a casing of the audio adapter 12. Left and right relief holes 17a and 17b are formed through the casing side wall 17 and are so arranged as to correspond to respective receiving holes 13a and 13b of the electronic still camera 11. Pawls 18a and 18b extend outwardly through respective relief holes 17a and 17b.

The pawls 18a and 18b are formed by bending portions of a movable plate, later described, and have respective inclined distal end surfaces 18a1 and 18b1, and also have respective lock holes 18a2 and 18b2 disposed adjacent to their distal ends.

A male connector portion 14b extends outwardly through the casing side wall 17 at the center thereof and is so disposed as to correspond to the connector hole 13c.

The audio adapter 12 further is provided with a known acousto-electric conversion mechanism including a microphone and an A/D converter.

Figure 2:
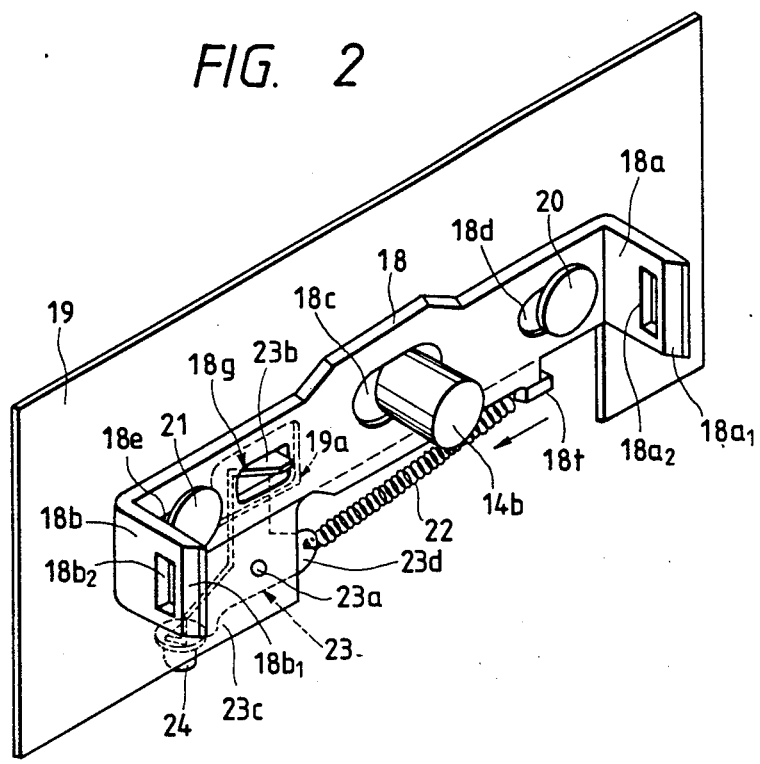
FIG. 2 is perspective view of an insertion mechanism provided on the audio adapter.

FIG. 2, which is a perspective view of the insertion mechanism incorporated in the audio adapter, shows the insertion mechanism as having the movable plate 18, a base plate 19, right and left slider pins 20 and 21 and the male connector portion 14b formed on the base plate 19, a spring 22, a lock release lever 23, and a lock release button 24.

The movable plate 18 is in the form of an elongated plate, and is bent at its opposite ends to form the right and left pawls 18a and 18b. A relief hole 18c receiving the male connector portion 14b is formed through the movable plate 18 at its central portion, and relief holes 18d and 18e, respectively receiving the slider pins 20 and 21, also are formed through the movable plate 18 at its opposite end portions. The movable plate 18 is mounted on the base plate 19 by the slider pins 20 and 21 extending through the respective relief holes 18d and 18e. Since each of the relief holes 18d and 18e is elongated in right and left directions, the movable plate 18 is movable in right and left directions over a predetermined distance.

More specifically, the movable plate 18 is movable between a left end of its stroke (hereinafter referred to "first position") where the shanks of the slider pins 20 and 21 engage the right end edges of the relief holes 18d and 18e, respectively, and a right end of the stroke (hereinafter referred to as "second position") where the shanks of the slider pins 20 and 21 engage the left end edges of the relief holes 18d and 18e, respectively.

The male connector portion 14b is formed perpendicularly on the base plate 19 and projects forwardly through the relief hole 18c. The base plate 19 is fixed to the casing of the audio adapter 12.

The spring 22 is connected at one end to a hook portion 18f formed on the lower right portion of the movable plate 18, and the other end of the spring 22 is connected to a third arm 23d of the lock release lever 23. Therefore, the movable plate 18 normally is urged in a direction of an arrow (FIG. 2) under tension of the spring 22. The lock release lever 23 cooperates with the lock release button 24 to provide a lock release mechanism for detaching the audio adapter 12.

Figure 3:
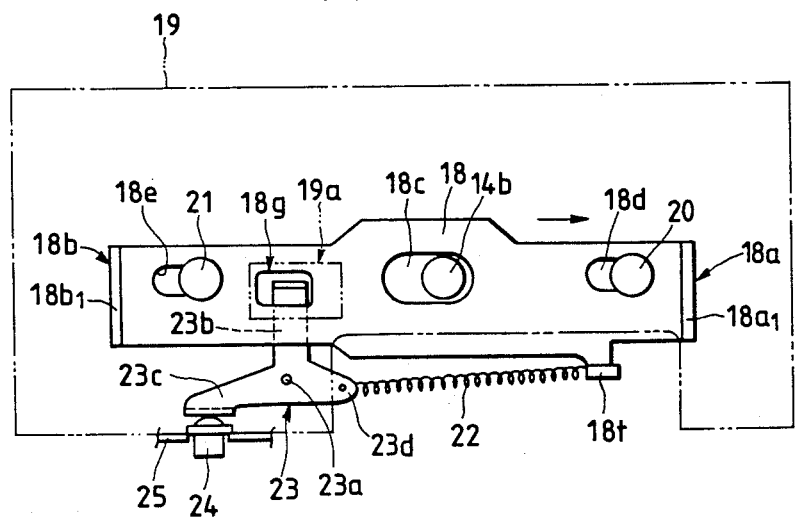
FIG. 3 is a front-elevation view of the insertion mechanism.

FIG. 3 is a front-elevational view of the lock release mechanism. As shown in this figure, the lock release lever 23 is angularly movably mounted on the reverse side of the base plate 19 by a pivot pin 23a (FIG. 2), and has first, second and third arms 23b, 23c and 23d extending radially of the pivot pin 23a. The first lever 23b has a distal bent end which extends through lever holes 19a and 18g, formed respectively through the base plate 19 and the movable plate 18, and which projects forwardly.

The second arm 23c has a distal bent end which is held against an upper spherical surface of the lock release button 24 mounted on a lower wall 25 of the casing. As previously mentioned, one end of the spring 22 is connected to the third arm 23d. The widths of the lever holes 19a and 18g formed respectively through the base plate 19 and the movable plate 18 are sufficiently larger than the distal bent end of the second arm 23c.

Since the tension of the spring 22 acts on the third arm 23d of the lock release lever 23, the lock release lever 23 is held in the following predetermined position in an inoperative condition. The distal bent end of the first arm 23b is held out of contact with the edge of the lever hole 18g of the movable plate 18, and does not urge the movable plate 18, so that the movable plate 18 is held in its first position. Also, the distal bent end of the second arm 23c abuts the lock release button 24 and urges this button 24 slightly downward.

Next, when the lock release button 24 is pushed by the finger from below, the lock release lever 23 is angularly moved clockwise about the pivot pin 23a, so that the distal bent end of the first arm 23b urges the right edge of the level hole 18g of the movable plate 18. As a result, the movable plate 18 is moved to the right (i.e., in a direction of an arrow in FIG. 3) into the second position against the tension of the spring 22.

Next, the manner of attachment and detachment of the audio adapter will be described with reference to FIGS. 4(a)-(c), which shows cross-sectionally the conditions of one pawl 18a of the insertion mechanism and one receiving hole 13a of the receptive mechanism during attachment and detachment.

First, the audio adapter 12 and the electronic still camera 11 are mated with each other so that the pawls 18a and 18b of the adapter 12 are inserted into respective receiving holes 13a and 13b of the camera 11. At an initial stage of this insertion operation, as shown in FIG. 4(a), the inclined surface 18a1 on the pawl 18a of the movable plate 18 is held in sliding contact with the lock tongue 13a1 in the receiving hole 13a of the electronic still camera 11 and gradually is inserted slidingly into the receiving hole 13.

Figure 4A:
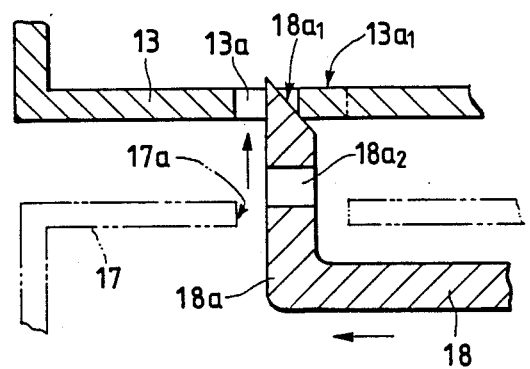
FIG. 4 is a view showing the attachment and detachment of the audio adapter.

At this time, the movable plate 18 is moved gradually against the tension of the spring 22 from the first position to the left (i.e., in a direction of an arrow in FIG. 4(a)).

Figure 4B:
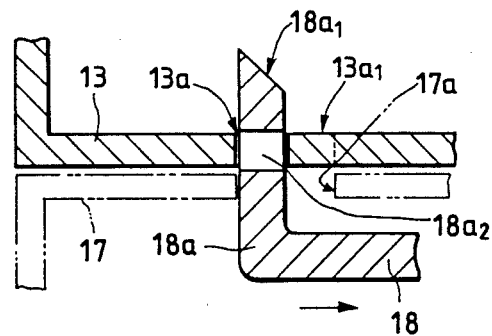
Figure 4C:
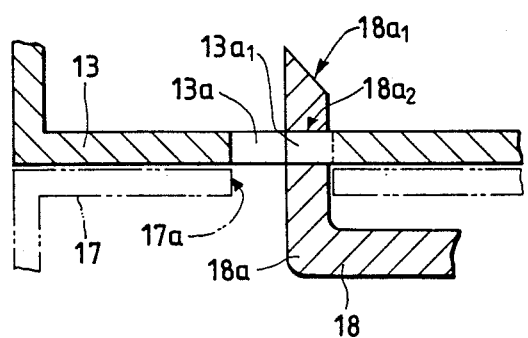
Figure 5:
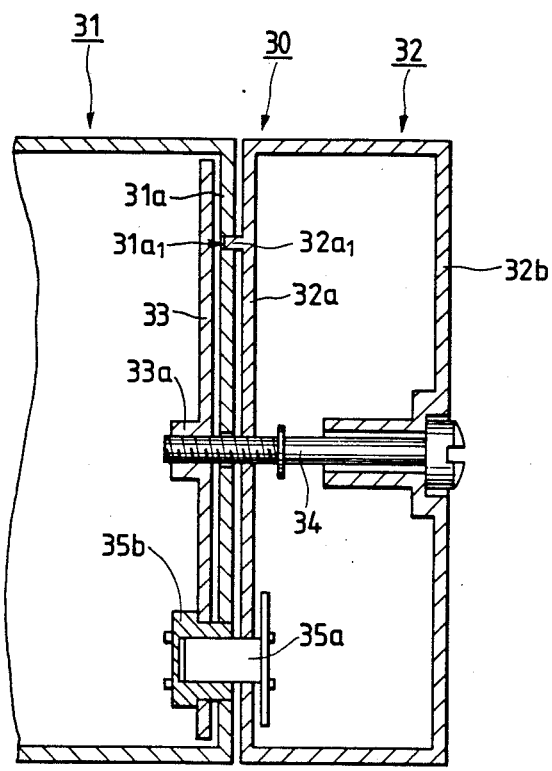
FIG. 5 is a fragmentary, cross-sectional view of a conventional device for removably attaching an audio adapter.

Then, the flat portion of the pawl 18a comes into contact with the lock tongue 13a1, and then the lock hole 18a2 is brought in registry with the lock tongue 13a1, as shown in FIG. 4(b). As a result, since the movable plate 18 is urged to the right by the spring 22 (i.e., in a direction of an arrow in FIG. 4(b)), the lock hole 18a2 is moved in the right-hand direction and is fitted on the lock tongue 13a1 as shown in FIG. 4(c), thereby achieving attachment of the audio adapter 12.

Although the operation of only one pawl 18a has been described above, the other pawl 18b operates in the same manner at the same time.

In the condition in which the audio adapter 12 is thus attached to the camera, the movable plate 18 is urged to the right by the tension of the spring 22 and hence is held in the first position. Therefore, even when the audio adapter 12 is pulled back, it will not be disengaged from the electronic still camera 11.

When the audio adapter 12 is to be removed from the camera, the lock release button 24 is pushed. As a result, the first arm 23b of the lock release lever 23 urges the edge of the lever hole 18g, so that the movable plate 18 is moved to the second position (FIG. 4(b)).

As a result, the lock hole 18a2 of the one pawl 18a is disengaged from the lock tongue 13a1, thereby releasing the lock. This operation also is done similarly with respect to the other pawl 18b. Then, the audio adapter 12 is pulled away from the electronic still camera 11 while pushing the lock release button 24, so that the adapter 12 can be removed from the camera.

In the above embodiment, although the insertion mechanism is provided on the audio adapter 12, the insertion side and the reception side may be reversed so that the insertion mechanism can be provided on the electronic still camera 11. Also, the movable plate and the lock release lever 23 can be urged by separate respective springs.

Although, by way of example, the above embodiment has been described with respect to the audio adapter for the electronic still camera 11, the present invention is similarly applicable to audio adapters for other optical equipment such as a motion picture camera and a video camera.

As described above, the audio adapter can be attached to and detached from an optical device, such as an electronic still camera, in one touch fashion and therefore can be handled easily and is very handy.

Further, the device for removably attaching the audio adapter can be provided on the side portions of the optical equipment and audio adapter in a compact manner. Particularly when the insertion mechanism is provided on the audio adapter, this is very advantageous from the viewpoint of the compactness of the electronic still camera. In this case, the arrangement of the associated parts within the audio adapter is not so limited by the provision of the insertion mechanism thereon.

Further, since the resilient member for urging the movable plate to move and the resilient member for urging the lock release mechanism can be a common member, the number of the component parts can be reduced.

What is claimed is:

1. A device for removably attaching an audio adapter to optical equipment, said device comprising:
   a receptive mechanism provided on one of said optical equipment and said audio adapter, said receptive mechanism including a receiving hole and a lock tongue;
   an insertion mechanism provided on the other of said optical equipment and said audio adapter, said insertion mechanism including a movable plate which is movable between a first position and a second position;
   means for urging said movable plate toward said first position;
   a pawl which projects from said movable plate into a position corresponding to said receiving hole, and including a lock hole engaged with said lock tongue; and
   a lock release mechanism for moving said movable plate to said second position against said means for urging.

2. A device according to claim 1, in which said receptive mechanism is provided on said optical equipment, said insertion mechanism being provided on said audio adapter.

3. A device according to claim 1, wherein said urging means comprise a resilient member for urging said movable plate toward said first position, said resilient member returning said lock release mechanism to an inoperative position.

4. A device according to claim 1, wherein said optical equipment is an electronic still camera.

5. A device according to claim 1, wherein said resilient members comprises a spring.

* * * * *